(12) United States Patent
Bourd et al.

(10) Patent No.: US 9,256,915 B2
(45) Date of Patent: Feb. 9, 2016

(54) GRAPHICS PROCESSING UNIT BUFFER MANAGEMENT

(71) Applicant: QUALCOMM Incorporated, San Diego, CA (US)

(72) Inventors: Alexei V. Bourd, San Diego, CA (US); Vineet Goel, Winter Park, FL (US)

(73) Assignee: QUALCOMM Incorporated, San Diego, CA (US)

(*) Notice: Subject to any disclaimer, the term of this patent is extended or adjusted under 35 U.S.C. 154(b) by 351 days.

(21) Appl. No.: 13/747,947

(22) Filed: Jan. 23, 2013

(65) Prior Publication Data

US 2013/0194286 A1  Aug. 1, 2013

Related U.S. Application Data

(60) Provisional application No. 61/591,733, filed on Jan. 27, 2012.

(51) Int. Cl.
| | |
|---|---|
| *G06T 1/60* | (2006.01) |
| *G09G 5/00* | (2006.01) |
| *G06F 9/54* | (2006.01) |
| *G06T 1/20* | (2006.01) |
| *G06F 9/50* | (2006.01) |

(Continued)

(52) U.S. Cl.
CPC .............. *G06T 1/60* (2013.01); *G06F 9/5038* (2013.01); *G06F 9/52* (2013.01); *G06F 9/544* (2013.01); *G06T 1/20* (2013.01); *G09G 5/001* (2013.01); *G09G 5/363* (2013.01); *G09G 2360/10* (2013.01); *G09G 2360/121* (2013.01)

(58) Field of Classification Search
CPC ......... G06T 1/60; G06T 1/20; G06T 2210/52; G09G 5/363; G09G 5/001; G09G 2360/121; G09G 2360/10; G09G 2360/06; G09G 2352/00; G06F 12/0842; G06F 12/0857; G06F 9/544
USPC ........................................................ 345/545
See application file for complete search history.

(56) References Cited

U.S. PATENT DOCUMENTS

| | | |
|---|---|---|
| 5,742,785 A | 4/1998 | Stone et al. |
| 7,117,481 B1 | 10/2006 | Agesen et al. |
| 7,928,990 B2 | 4/2011 | Jiao et al. |

(Continued)

FOREIGN PATENT DOCUMENTS

| | | |
|---|---|---|
| EP | 1944735 A1 | 7/2008 |
| JP | EP1944735 A1 * | 7/2008 |
| WO | 2011012157 A1 | 2/2011 |

OTHER PUBLICATIONS

Gaster et al., "Khronos OpenCL 1.1 extension for atomics counters" version 5, May 26, 2011, 2 pp., found at http://www.khronos.org/registry/cl/extensions/ext/cl_ext_atomic_counters_32.txt.

(Continued)

*Primary Examiner* — Kee M Tung
*Assistant Examiner* — Yuehan Wang
(74) *Attorney, Agent, or Firm* — Shumaker & Sieffert, P.A.

(57) ABSTRACT

The techniques are generally related to management of buffers with a management unit that resides within an integrated circuit that includes a graphics processing unit (GPU). The management unit may ensure proper access to the buffers by the programmable compute units of the GPU to allow the GPU to execute kernels on the programmable compute units in a pipeline fashion.

23 Claims, 5 Drawing Sheets

(51) Int. Cl.
*G06F 9/52* (2006.01)
*G09G 5/36* (2006.01)

(56) References Cited

U.S. PATENT DOCUMENTS

| | | | |
|---|---|---|---|
| 8,087,029 B1 | 12/2011 | Lindholm et al. | |
| 8,135,926 B1 | 3/2012 | Glasco et al. | |
| 2004/0160446 A1* | 8/2004 | Gosalia et al. | 345/503 |
| 2010/0250809 A1 | 9/2010 | Ramesh et al. | |
| 2011/0063313 A1 | 3/2011 | Bolz et al. | |
| 2011/0141122 A1* | 6/2011 | Hakura et al. | 345/505 |
| 2012/0092351 A1 | 4/2012 | Barnes | |
| 2012/0320070 A1 | 12/2012 | Arvo | |

OTHER PUBLICATIONS

Munshi, "The OpenCL Specification," Version 1.1, Document Revision 36, Khronos OpenCL Working Group, Sep. 30, 2010, 379 pp.
Munshi, "The OpenCL Specification," Version 1.2, Document Revision 19, Khronos OpenCL Working Group, Nov. 14, 2012, 380 pp.
Averlogic Technologies Inc: "AL440B Data Sheets Version 1.0", Nov. 28, 2001, XP002694833, 34 pp.
Averlogic Technologies Inc: "AverLogic Video FIFO Selection Guide", Jan. 16, 2009, XP002694834, 1 pp.
International Search Report and Written Opinion—PCT/US2013/022900—ISA/EPO—Apr. 17, 2013, 16 pp.
Response to Written Opinion, dated Apr. 17, 2013, from International Application No. PCT/US2013/022900, filed Nov. 26, 2013, 25 pp.
Second Written Opinion from International Application No. PCT/US2013/022900, dated Jan. 16, 2014, 10 pp.
Response to Second Written Opinion, dated Jan. 16, 2014, from International Application No. PCT/US2013/022900, filed Mar. 14, 2014, 8 pp.
International Preliminary Report on Patentability from International Application No. PCT/US2013/022900, dated Apr. 24, 2014, 11 pp.

* cited by examiner

GRAPHICS PROCESSING UNIT BUFFER MANAGEMENT

This application claims the benefit of U.S. Provisional Application 61/591,733 filed Jan. 27, 2012, the entire content of which is hereby incorporated by reference in its entirety.

TECHNICAL FIELD

This disclosure relates to memory access management, and more particularly to memory access management in graphics processing devices (GPUs).

BACKGROUND

Graphics processing units (GPUs) are being used for purposes in addition to graphics processing. For example, non-graphics related applications may execute with increased speed by exploiting the massive parallelism of a GPU. This has led to GPUs that provide additional non-graphics related processing functionality and are referred to as general purpose GPUs (GPGPUs). For instance, a GPGPU includes one or more shader cores, and the shader cores are configured to execute applications such as graphics related applications, as well as non-graphics related applications.

SUMMARY

In general, this disclosure is related to techniques for managing a buffer that is in global memory and that stores data for a graphics processing unit (GPU) with the GPU. For example, an integrated circuit (IC) chip that includes the GPU includes a pipeline management unit. The pipeline management unit may be configured to maintain the state information of one or more buffers in the global memory. When an application executing on the GPU is to access the buffers in the global memory, the state information of the buffers in the global memory may be available internal to the IC chip. In this way, the GPU does not need to perform off-chip memory access to determine the state information of the buffers in the global memory.

In one example, the disclosure describes a method for execution of data processing operations in a pipeline fashion. The method includes executing a first thread on a first programmable compute unit of a shader processor of a graphics processing unit (GPU), and executing a second thread on a second programmable compute unit of the shader processor of the GPU. The method also includes receiving, with a management unit within an integrated circuit (IC) that includes the GPU, a request from the first programmable compute unit to store data produced by the execution of the first thread into a buffer in a global memory external to the IC. In this example, the data produced by the execution of the first thread is to be consumed by the second programmable compute unit executing the second thread. Also, in this example, the buffer comprises one of a first-in-first-out (FIFO) buffer and a ring buffer. The method also includes determining, with the management unit, a location within the buffer where the data produced by the execution of the first thread is to be stored, and storing, with the IC, the data produced by the execution of the first thread in the determined location within the buffer.

In one example, the disclosure describes an apparatus. The apparatus includes a global memory that includes a buffer. In this example, the buffer comprises one of a first-in-first-out (FIFO) buffer and a ring buffer. The apparatus also includes an integrated circuit (IC) that includes a graphics processing unit (GPU) and a management unit. The GPU includes a first programmable compute unit configured to execute a first thread, and a second programmable compute unit configured to execute a second thread. The management unit is configured to receive a request from the first programmable compute unit to store data produced by the execution of the first thread into the buffer in the global memory. In this example, the data produced by the execution of the first thread is to be consumed by the second programmable compute unit executing the second thread. The management unit is also configured to determine a location within the buffer where the data produced by the execution of the first thread is to be stored. In this example, the IC is configured to store the data produced by the execution of the first thread in the determined location within the buffer.

In one example, the disclosure describes an apparatus. The apparatus includes a global memory and an integrated circuit (IC). The global memory includes a buffer. In this example, the buffer comprises one of a first-in-first-out (FIFO) buffer and a ring buffer. The IC includes a graphics processing unit (GPU) comprising means for executing a first thread, and means for executing a second thread. The IC also includes means for receiving a request from the means for executing the first thread to store data produced by the execution of the first thread into the buffer in the global memory. In this example, the data produced by the execution of the first thread is to be consumed by the means for executing the second thread. The IC also includes means for determining a location within the buffer where the data produced by the means for executing the first thread is to be stored, and means for storing the data produced by the execution of the first thread in the determined location within the buffer.

In one example, the disclosure describes a computer-readable storage medium having instructions stored thereon that when executed cause one or more processors to execute a first thread on a first programmable compute unit of a shader processor of a graphics processing unit (GPU), and execute a second thread on a second programmable compute unit of the shader processor of the GPU. The instructions also cause the one or more processors to receive, with a management unit within an integrated circuit (IC) that includes the GPU, a request from the first programmable compute unit to store data produced by the execution of the first thread into a buffer in a global memory external to the IC. In this example, the data produced by the execution of the first thread is to be consumed by the second programmable compute unit executing the second thread. Also, in this example, the buffer comprises one of a first-in-first-out (FIFO) buffer and a ring buffer. The instructions also cause the one or more processors to determine, with the management unit, a location within the buffer where the data produced by the execution of the first thread is to be stored, and store, with the IC, the data produced by the execution of the first thread in the determined location within the buffer.

The details of one or more examples are set forth in the accompanying drawings and the description below. Other features, objects, and advantages will be apparent from the description and drawings, and from the claims.

DETAILED DESCRIPTION

Figure 1:
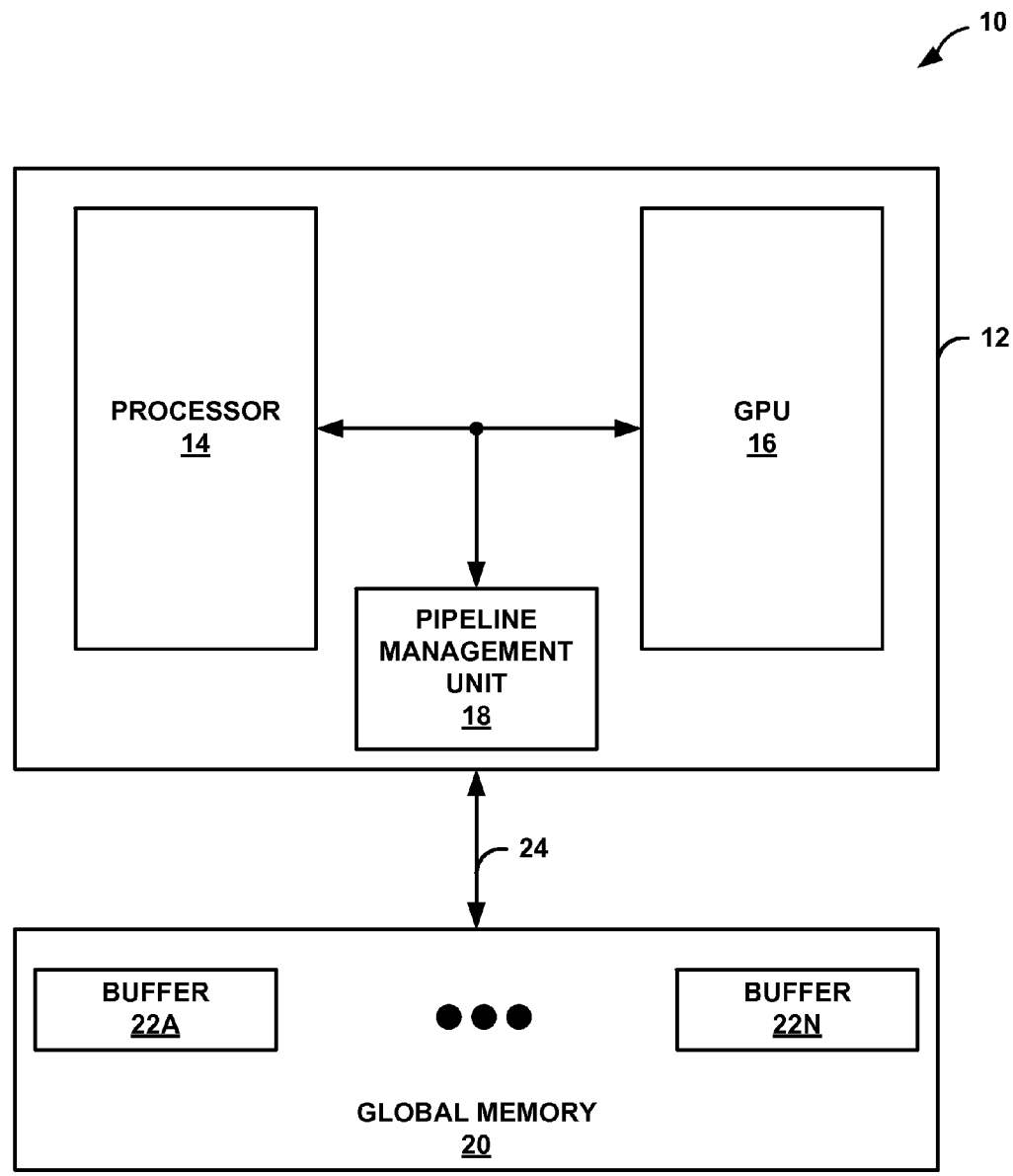
FIG. 1 is a block diagram illustrating an example of a device in accordance with one or more examples described in this disclosure.

A graphics processing unit (GPU) may include a shader processor that is configured to execute one or more applications. Examples of these applications include shader programs such as vertex shaders, hull shaders, fragment shaders, geometry shaders, and other such applications related to graphics processing. In addition, some applications developers may consider it beneficial to exploit the massive parallelism of the GPU and execute non-graphics related applications on the GPU. For example, the processing parallelism provided by a GPU may be suitable to execute parallel matrix operations, even when the matrix operations are unrelated to graphics processing. Other examples of non-graphics related applications include techniques related to fluid dynamics or linear algebra in which quick execution of parallel operations may be beneficial. The non-graphics related applications may also execute on the shader processor.

A GPU that is capable of executing such non-graphics related applications may be considered as a general purpose GPU (GPU). For example, when a GPU is executing non-graphics related applications, the GPU is functioning as a GPGPU. Most all GPUs may be configured to function as a GPGPU.

For purposes of illustration, this disclosure describes techniques with respect to a GPU functioning as a GPGPU. However, the techniques are not limited to instances where the GPU is functioning as a GPGPU (i.e., executing non-graphics related applications), and the techniques may also apply to instances where the GPU is executing graphics related applications. Moreover, the techniques described in this disclosure may be implemented by any type of a processing unit such as a central processing unit (CPU), an accelerator, or any other custom device. While the techniques are described with respect to a GPU, it should be understood that the techniques are extendable to other types of processing units.

The shader processor within the GPU may include a plurality of shader cores (also referred to as programmable compute units to indicate that these cores can execute instructions for both graphics and non-graphics related applications). Each of the programmable compute units may include a local memory reserved for instructions to be executed by that programmable compute unit, as well as data produced by the execution of the instructions, such as intermediate results produced during the execution of the threads. The local memory of the programmable compute unit may be inaccessible by other programmable compute units. In some instances, different applications that are to be executed on the GPU may be executed by different programmable compute units.

In the techniques described in this disclosure, graphics related applications are referred to as shaders, and non-graphics related applications are referred to as kernels. For instance, examples of shaders (i.e., graphics related applications) include, but are not limited to, a vertex shader, a fragment shader, and a geometry shader. Examples of kernels (i.e., non-graphics related applications) include applications to perform matrix operations, fluid dynamics, image processing operations, video processing operations, and the like.

Furthermore, the kernels need not necessarily be limited to only applications that are executed by the GPU, and also include fixed-function units (i.e., non-programmable units) of the GPU. For purposes of illustration only, the techniques described in this disclosure are described with respect to the kernels being applications that are executed on the GPU. For example, the techniques are described with respect to non-graphics related applications executing on the shader processor of a GPU so that the GPU functions as a GPGPU.

A kernel may include a plurality of work groups, tasks, or threads (all of which are used synonymously in this disclosure). For example, a thread may be a set of instructions of the kernel that can be independently executed from the other threads of the kernel. In some examples, to execute a kernel, one or more of the programmable compute units may each execute one or more threads of the kernel. For instance, a first programmable compute unit may execute a first thread of the kernel, and a second programmable computer unit may execute a second thread of the same kernel. In some examples, one programmable compute unit may execute one or more threads of one kernel, while another programmable compute unit executes one or more threads of another kernel. In some examples, a combination of the two may be possible (i.e., some programmable compute units are executing different threads of the same kernel, while some other programmable compute units are executing threads of different kernels).

In general, the GPU may be configured to implement a single program multiple data (SPMD) programming model. In the SPMD programming model, the GPU may execute a kernel on multiple programmable compute units (e.g., as threads), where each programmable compute unit performs functions on its own data. Also, in the SPMD programming model, the programmable compute units include respective program counters that indicate the current instruction being executed by the programmable compute units.

While GPUs provide massive parallelism for processing, GPUs may not be well-suited for executing kernels in a pipeline fashion. Executing kernels in a pipeline fashion means executing kernels such that data produced by one kernel is consumed by another kernel. As another example, executing kernels in a pipeline fashion means executing a thread of the kernel that produces data that is to be consumed by another thread of the same kernel. In this disclosure, a thread that produces the data may be referred to as a producer thread and the thread that receives the data may be referred to as a consumer thread.

In some examples, the producer thread and the consumer thread may be threads of the same kernel. In some examples, the producer thread and the consumer thread may be threads of different kernels. In these examples, the kernel that includes the producer thread may be referred to as a producer kernel, and the kernel that includes the consumer thread may be referred to as a consumer kernel.

For example, executing kernels in a pipeline fashion may be envisioned as a first thread (e.g., a producer thread of a kernel) producing data that is consumed by a second thread (e.g., a consumer thread of the same kernel or of a different kernel). This second thread (which was a consumer for the first thread), may be a producer thread for a third thread (e.g., the second thread produces data that is consumed by the third thread). The third thread may be a thread for a kernel different than the kernel that includes the first and second threads or may be a thread for one of the kernels that includes the first and second threads. In this example, the first, second, and third threads may be envisioned as forming a processing pipeline.

Executing kernels in a pipeline fashion should not be interpreted to require the kernels or threads to be executed serially (e.g., one after the other). For example, in the above example, it may be possible for the GPU to execute two or more of the first, second, and third threads in parallel (e.g., at the same time). However, it may also be possible for the GPU to execute the threads serially, and still be considered as executing the kernels in a pipeline fashion.

A programmable compute unit, executing a producer thread of a kernel, may need to output the produced data to global memory (i.e., off-chip, system memory external to the integrated circuit (IC) that includes the GPU), where the global memory may be accessible, for example, via a system bus. Another programmable compute unit, executing a consumer thread of the same kernel or different kernel, may need to receive the produced data from the global memory. As described in more detail, for existing GPUs, management of the global memory may be computational-, time- and/or power inefficient, resulting in poor performance when executing kernels in a pipeline fashion.

This disclosure describes techniques for computational-, time- and power-efficient management of the global memory. As described in more detail, the integrated circuit (IC) that includes the GPU may include a pipeline management unit (PMU). Alternatively, the GPU itself may include the PMU. The PMU may be configured to manage the state information of the global memory that stores the produced data that is to be consumed. For example, a processor or the GPU itself may reserve locations within the global memory of where data produced by the programmable compute units is to be stored in the global memory. These reserved locations within the global memory may be considered as a plurality of buffers. In some examples, the plurality of buffers may form a ring buffer or a first-in-first-out (FIFO) buffer. A ring buffer may be considered as one example of a FIFO buffer.

The PMU may store information, internal to the IC or the GPU (e.g., in an on-chip, internal cache memory) which indicates state information of the buffers in the off-chip global memory. As one example, the PMU may store information that indicates the starting address and the ending address of buffers in the global memory. As another example, the PMU may store the address of the buffer within the plurality of buffers where the produced data is to be stored, as well as addresses of the buffer within the plurality of buffers where the data to be consumed is to be read. As yet another example, the PMU may store information that indicates whether a producer kernel completed the production of data so that the programmable compute unit that is executing a thread of the consumer kernel that needs the data can proceed with executing other threads of the consumer kernel that do not need the data.

In the techniques described in this disclosure, the PMU may receive a request to store data produced by a producer thread into the buffer, and may receive a request to retrieve the data produced by the producer thread from the buffer for consumption by a consumer thread. The PMU may determine a location within the buffer from where the data produced by the execution of the producer thread is to be stored based on the stored state information of the buffers, and determine the location within the buffer from where the data to be consumed by the consumer kernel is to be retrieved based on the stored state information of the buffers.

By managing the state information of the global memory with information stored internal to the IC that includes the GPU or internal to the GPU itself, the techniques described in this disclosure may minimize the number of times the GPU needs to access the global memory. For example, the PMU may not need to determine the addresses of where the data is to be stored or retrieved from by accessing such information external to the IC that includes the GPU. Minimizing the number of times the GPU needs to access the global memory may reduce power consumption, reduce system bus bandwidth load, and reduce latency.

Moreover, as described in more detail below, in existing GPUs, the kernels need to include instructions that manage the global memory. The GPU may waste clock cycles executing such global memory management instructions, which may be computationally inefficient. With the PMU managing the state information of the global memory, the kernels may not need to include global memory management instructions, which results in less complex kernel instructions, as well as fewer kernel instructions that need to be executed. In this manner, the techniques described in this disclosure may promote computational efficiencies.

FIG. 1 is a block diagram illustrating an example of a device in accordance with one or more examples described in this disclosure. For instance, FIG. 1 illustrates device 10. Examples of device 10 include, but are not limited to, video devices such as media players, set-top boxes, wireless handsets such as mobile telephones, personal digital assistants (PDAs), desktop computers, laptop computers, gaming consoles, video conferencing units, tablet computing devices, and the like. Device 10 may include components in addition to those illustrated in FIG. 1.

As illustrated, device 10 includes integrated circuit (IC) 12 and global memory 20. Global memory 20 may be considered as the memory for device 10. Global memory 20 may comprise one or more computer-readable storage media. Examples of global memory 20 include, but are not limited to, a random access memory (RAM), an electrically erasable programmable read-only memory (EEPROM), flash memory, or any other medium that can be used to carry or store desired program code in the form of instructions and/or data structures and that can be accessed by a computer or a processor.

In some aspects, global memory 20 may include instructions that cause processor 14 and/or GPU 16 to perform the functions ascribed to processor 14 and GPU 16 in this disclosure. Accordingly, global memory 20 may be a computer-readable storage medium having instructions stored thereon that, when executed, cause one or more processors (e.g., processor 14 and GPU 16) to perform various functions.

Global memory 20 may, in some examples, be considered as a non-transitory storage medium. The term "non-transitory" may indicate that the storage medium is not embodied in a carrier wave or a propagated signal. However, the term "non-transitory" should not be interpreted to mean that global memory 20 is non-movable or that its contents are static. As one example, global memory 20 may be removed from device 10, and moved to another device. As another example, a global memory, substantially similar to global memory 20, may be inserted into device 10. In certain examples, a non-transitory storage medium may store data that can, over time, change (e.g., in RAM).

IC 12 includes processor 14, graphics processing unit (GPU) 16, and pipeline management unit (PMU) 18. IC 12 may be any type of an integrated circuit that houses or forms processor 14, GPU 16, and PMU 18. For example, IC 12 may be considered as a processing chip within a chip package. PMU 18 may be a hardware unit that forms part of IC 12 or may be hardware within GPU 16. It may be possible for PMU 18 to be software executing on hardware within IC 12 or within GPU 16. For purposes of illustration and description, the techniques are described with respect to PMU 18 being a hardware unit.

Although processor 14, GPU 16, and PMU 18 are illustrated as being part of a single IC 12, aspects of this disclosure are not so limited. In some examples, processor 14 and GPU 16 may be housed in different integrated circuits (i.e., different chip packages). In these examples, PMU 18 may be housed in the same integrated circuit as GPU 16. In some examples, PMU 18 may be formed as part of GPU 16. As one example, processor 14 and GPU 16 may be housed in the same integrated circuit (i.e., same chip package), and PMU 18 may be formed within GPU 16. As another example, processor 14 and GPU 16 may be housed in different integrated circuits (i.e., different chip packages), and PMU 18 may be formed within GPU 16.

Examples of processor 14, GPU 16, and PMU 18 include, but are not limited to, a digital signal processor (DSP), general purpose microprocessor, application specific integrated circuit (ASIC), field programmable logic array (FPGA), or other equivalent integrated or discrete logic circuitry. In some examples, GPU 16 and PMU 18 may be specialized hardware that includes integrated and/or discrete logic circuitry that provides GPU 16 with massive parallel processing capabilities suitable for graphics processing and that provides PMU 18 with managing global memory 20, as described in more detail below. In some instances, GPU 16 may also include general purpose processing, and may be referred to as a general purpose GPU (GPGPU) when implement general purpose processing tasks (i.e., non-graphics related tasks).

Processor 14, sometimes referred to as a host, may be the central processing unit (CPU) of device 10. Processor 14 may execute various types of applications. Examples of the applications include web browsers, electronic readers, e-mail applications, spreadsheets, video games, video playback, audio playback, word processing, or other applications that generate viewable objects for display, or any other types of applications. Global memory 20 may store instructions for execution of the one or more applications.

In some examples, processor 14 may offload processing tasks to GPU 16, such as tasks that require massive parallel operations. As one example, graphics processing requires massive parallel operations, and processor 14 may offload such graphics processing tasks to GPU 16. In some examples, processor 14 may offload tasks that are unrelated to graphics processing to GPU 16. For instance, matrix operations require parallel operations, and GPU 16 may be better suited to implement such operations as compared to processor 14.

To implement tasks, GPU 16 may be configured to execute one or more applications. For instance, for graphics related processing, GPU 16 may execute applications such as vertex shaders, fragment shaders, and geometry shaders. For non-graphics related processing, GPU 16 may execute applications designed for such processing (e.g., an application for implementing matrix operations or an application for fluid dynamics). For either example (e.g., graphics related processing or non-graphics related processing), processor 14 may instruct GPU 16 to execute the one or more applications.

Processor 14 may communicate with GPU 16 in accordance with a particular application processing interface (API). For example, processor 14 may transmit instructions to GPU 16 such as instructions that instruct GPU 16 to execute one or more applications utilizing the API. Examples of such APIs include the DirectX® API by Microsoft®, the OpenGL® by the Khronos group, and the OpenCL® by the Khronos group; however, aspects of this disclosure are not limited to the DirectX, the OpenGL, or the OpenCL APIs, and may be extended to other types of APIs that have been developed, are currently being developed, or are to be developed in the future. Moreover, the techniques described in this disclosure are not required to function in accordance with an API, and processor 14 and GPU 16 may utilize any technique for communication.

As one example, for graphics related applications, processor 14 may communicate with GPU 16 using the OpenGL API. For non-graphics related applications, processor 14 may communicate with GPU 16 using the OpenCL API. Again, the techniques described in this disclosure do not necessarily require processor 14 to communicate with GPU 16 using the OpenGL and/or OpenCL APIs.

The graphics related applications that GPU 16 is to execute may be referred to as shaders, and the non-graphics related applications that GPU 16 is to execute may be referred to as kernels. For example, global memory 20 may store the instructions of the shaders and kernels, and a compiler executing on processor 14 may convert the instructions of the shaders and kernels into object code for execution on GPU 16. As another example, global memory 20 may store the object code of the shaders and kernels that GPU 16 retrieves and executes.

Examples of the shaders include the vertex shader, fragment shader, and geometry shader for graphics related processing. Examples of kernels include applications that are unrelated to graphics processing (e.g., for linear algebra or fluid dynamics). As additional examples, kernels include applications for image processing and video processing.

GPU 16 may include a shader processor, and the shader processor may execute the shaders and kernels. For instance, the shader processor of GPU 16 may include one or more shader cores (referred to as programmable compute units), and each of the one or more programmable compute units may execute a kernel.

Although kernels are described as being applications that execute on GPU 16, kernels should not be considered as so limiting. Other examples of kernels include fixed-function units of GPU 16. For example, GPU 16 includes programmable compute units and fixed-function units. The programmable compute units may provide functional flexibility by executing applications. Fixed-function units may be hardware units that do not provide functional flexibility and may be designed for specific purposes. In general, the term kernel refers to any application or hardware units that receive data, process the data, and output the data for non-graphics related purposes. However, for purposes of illustration, the techniques described in this disclosure are described with examples where the kernels are applications with the understanding that these techniques are extendable to examples where kernels are fixed-function units.

In the techniques described in this disclosure, rather than one programmable compute unit executing all of the instructions of a kernel, it may be possible for multiple programmable compute units to execute portions of the kernel. A portion of a kernel may be referred to as a work group, task, or thread (all are synonymous). For example, a work group, task, or thread of a kernel is a set of instructions that can be executed independently of other work groups, tasks, or threads of the kernel.

In some examples, a first set of one or more programmable compute units may execute threads of a kernel, and a second set of one or more programmable compute units may execute threads of a kernel. In some cases, the threads that the first set of programmable compute units and the second set of programmable compute units execute may be threads of the same kernel. In some cases, the threads that the first set of programmable compute units and second set of programmable compute units execute may be threads of different kernels. In either of these examples, one of the threads may need to output the generated data to another one of the threads. In other words, GPU 16 may execute the kernels in a pipeline fashion.

As described above, executing kernels in a pipeline fashion may mean executing kernels such that data produced by one thread is consumed by another thread, and data produced by this other thread is consumed by yet another thread, and so forth. In these examples, the threads may be threads of different kernels, the same kernel, or some threads may be for different kernels and other threads may be for the same kernel. In these examples, the kernels may be viewed as forming a pipeline in which data is produced and consumed. For example, a first, second, and third threads of the same kernel or different kernels may form a pipe, in which the first thread produces data and transmits the data to be consumed by the second thread for processing. The second thread processes the received data to produce data, and transmits the produced data to the third thread for processing, and so forth.

In this example, the first thread may be referred to as a producer thread, the second thread may be referred to as a consumer thread for the first thread and a producer thread for the third thread, and the third thread may be referred to as a consumer thread. In examples, where the first, second, and third threads are for different kernels (e.g., first, second, and third kernels, respectively), the first kernel may be referred to as a producer kernel, the second kernel may be referred to as a consumer kernel for the first kernel and a producer kernel for the third kernel, and the third kernel may be referred to as a consumer kernel.

In existing GPUs, executing kernels in a pipeline fashion may be computationally and power inefficient. For example, each of the programmable compute units may include local memory for storing instructions that are to be executed by the programmable compute unit, for storing data that is to be processed, and for storing data that is produced, including intermediate results that may be produced. However, a local memory of the programmable compute unit may not be accessible by any other programmable compute units.

Accordingly, in some examples, to execute kernels in a pipeline fashion, GPU 16 may retrieve produced data stored in a local memory of a programmable compute unit and store the produced data in global memory 20. Storing data in global memory 20 may be referred to a storing data off-chip because global memory 20 is external to the integrated circuit that houses GPU 16 (i.e., external to IC 12). GPU 16 may then retrieve the data stored in global memory 20 and load the retrieved data into the local memory of another programmable compute unit.

As an illustrative example, assume that a first programmable compute unit is executing threads of a producer kernel. In this example, the first programmable compute unit may store data produced by the execution of the threads of the producer kernel in the local memory of the first programmable compute unit. GPU 16 may retrieve the produced data from the local memory of the first programmable compute unit and store the produced data in global memory 20.

In this example, assume that a second programmable compute unit is executing threads of a consumer kernel. In this example, GPU 16 may retrieve the data produced by the producer kernel from global memory 20 and load the data into the local memory of the second programmable compute unit. The consumer kernel may then consume the data stored into the local memory of the second programmable unit.

In the above example, GPU 16 may need to store the data produced by the producer kernel into global memory 20 because the second programmable compute unit does not have access to the local memory of the first programmable compute unit. In this way, global memory 20 functions as an intermediate storage of produced data that is to be subsequently consumed.

In general, managing the manner in which produced data is stored to and/or the manner in which data is to be retrieved from global memory 20 may be processing and computationally inefficient. As one example, it may be possible, although inefficient, for the kernels to manage the manner in which data is stored in global memory 20. For example, the kernels could include instructions that cause the arithmetic logic units (ALUs) of the programmable compute units to determine the address (e.g., pointers) within global memory 20 for where the data is to be stored or for where the stored data is to be retrieved.

As another example, global memory 20 may store an atomic counter. The value of the atomic counter may indicate whether data is available to be consumed. For example, the producer kernel may include instructions to read the current value of the atomic counter stored in global memory 20. The producer kernel may also include instructions that modify the value of the atomic counter based on the amount of data that the producer kernel stored and instructions that write the modified value of the atomic counter back into global memory 20.

The consumer kernel may include instructions to periodically check the value of the atomic counter stored in global memory 20. When the value of the atomic counter is sufficiently large, the consumer kernel may determine that the data to be consumed is available. For example, assume that the value of the atomic counter is X, and that the producer kernel produced N amounts of data. In this example, the consumer kernel may include instructions that cause the programmable compute unit, which is executing the threads of the consumer kernel, to periodically check the value of the atomic counter. When the programmable compute unit determines that the value of the atomic counter is X plus N, the programmable compute unit may request GPU 16 to retrieve the stored data from global memory 20 for consumption.

In this way, it may be possible using software (i.e., the instructions of kernel) to execute the kernels in a pipeline fashion. However, there may be various reasons why executing the kernels in the pipeline fashion using instructions within the kernel is inefficient. For instance, including instructions in the kernels to determine the addresses of where to store data or where the data is stored in global memory 20 may require the ALUs of the programmable compute units to unnecessarily consume power, as well as waste clock cycles processing instructions for determining the addresses within global memory 20.

Furthermore, periodically checking the value of the atomic counter requires GPU 16 to access information off-chip (i.e., in global memory 20). Reading the value of the atomic counter from global memory 20 and writing the modified value of the atomic counter to global memory 20 may consume an undesirable amount of power. Also, as illustrated, IC 12 is coupled to global memory 20 via memory bus 24. There may be bandwidth limitations on the amount of data that memory bus 24 can handle. Accordingly, there may be delay from when GPU 16 can read and write the value of the atomic counter.

Moreover, because the time when the data is available to be consumed by the consumer kernel is unknown, the programmable compute unit, executing the consumer kernel, may periodically cause GPU 16 to check the value of the atomic counter to determine whether data is available to be consumed. Periodically checking the value of the atomic counter may cause the threads of the consumer kernel to remaining "spinning " For example, if the read value of the atomic counter indicates that data is not yet fully available for consumption, the programmable compute unit may pause the execution of the threads of the consumer kernel, until the programmable compute unit once again checks the value of the atomic counter. If the data is still not available, the programmable compute unit waits again, and causes GPU 16 to check again whether data is available. In this example, the threads of the consumer kernel may remain in a busy-wait during the time when the data to be consumed is not available in global memory 20. In other words, during the spinning, the programmable compute unit may not be performing any functions, which may delay the consumption of the data.

If the frequency at which the programmable compute unit determines whether data is available (e.g., by reading the value of the atomic counter) is high, then GPU 16 may waste power by too frequently reading the value of the atomic counter stored in global memory 20. If the frequency at which the programmable compute unit determines whether data is available is low, then there may be wasted time between when the data is available and when GPU 16 retrieves the data, which also delays the consumption of the data.

Also, in some of the above techniques in which global memory 20 stores the atomic counter, when one kernel is reading, modifying, and writing the value of the atomic counter, no other kernel is allowed to read, modify, or write the value of the atomic counter. In such cases, when two producer threads need to output data for storage in global memory 20 at the same time, one of the threads will be able to output data, but the other thread may not be able to output data because this other thread may not be able to access the atomic counter. In such cases, the thread, which was denied storage access, may spin until access to the atomic counter is available, and when the atomic counter is available for access, the thread, which was denied storage access, may output the data to global memory 20. The same may occur when two consumer threads attempt to access data at the same time.

The techniques described in this disclosure may allow GPU 16 to more efficiently execute kernels in a pipeline fashion, as compared to the techniques described above. As described in more detail, pipeline management unit (PMU) 18 may be configured to store state information of the data that is produced by various threads and data that is to be consumed by the various threads. In this manner, GPU 16 may not need to continuously access information, off-chip, indicating where the data is stored and when the data is available for consumption. Rather, PMU 18 may store such information internally (i.e., within IC 12).

As illustrated, global memory 20 may include buffer 22A-22N (collectively referred to as buffers 22). Buffers 22 may be storage locations within global memory 20. Examples of buffers 22 include a first-in-first-out (FIFO) buffer or a ring buffer.

Processor 14 may be configured to define the number of buffers that reside within global memory 20 and reserve storage locations within global memory 20. For example, processor 14 may define the starting and ending locations of buffers 22 (i.e., starting and ending addresses). Processor 14 may define the number of buffers that reside within global memory 20 based on the number of programmable compute units that reside within the shader processor of GPU 16. As one example, processor 14 may define the number of buffers that reside within global memory 20 such that there are one or more input buffers 22 for each programmable compute unit (i.e., one or more buffers that store data to be consumed by kernels executing on the programmable compute units) and zero or more output buffers 22 for each programmable compute unit (i.e., zero or more buffers that store data produced by kernels executing on the programmable compute units of GPU 16).

In addition, processor 14 may be configured to define the size of the buffers. For instance, processor 14 may be configured to define the number of storage locations within each of buffers 22 (e.g., the length of buffers 22). Processor 14 may also define the amount of data that can be stored in each of the storage locations (e.g., the width of buffers 22). In some examples, processor 14 may pre-populate buffers 22 with data.

In some examples, processor 14 may be configured to define a minimum number of buffers 22. As one example, processor 14 may be configured to define a minimum of 128 buffers 22. The minimum number of buffers 22 being 128 is provided for purposes of illustration and should not be considered limiting. The minimum number of buffers 22 may be greater than or less than 128. In some examples, there may not be a requirement for a minimum number of buffers 22.

Processor 14 may also be configured to execute various instructions to determine the status of buffers 22. For example, processor 14 may execute instructions to copy data stored in buffers 22 into buffers within IC 12 or GPU 16 and instructions to copy data stored within buffers of IC 12 or GPU 16 into buffers 22. Processor 14 may also execute instructions that define the amount of data stored in buffers 22, as well as instructions that confirm the length and width of buffers 22 (e.g., to ensure that buffers 22 have not been corrupted). Such execution of instructions that allow processor 14 to determine the status of buffers 22 is not required in every example, but may potentially assist the developer of the kernels to determine the status of buffers 22 by executing instructions on processor 14, rather than GPU 16.

In some examples, processor 14 may be configured to define an amplification factor for buffers 22. The amplification factor may indicate the maximum number of elements that can be produced by a thread of a kernel for storing in one of buffers 22. The amplification factor may be needed for situations where one of buffers 22 that is to store data cannot store all of the produced data. This may result in the stalling the execution of a kernel due to insufficient storage space in buffers 22 and could lead to deadlock (e.g., where the kernel never returns to a state of execution).

To minimize the chances of such deadlock, processor 14 may reserve large portions of global memory 20 (e.g., define long and wide buffers 22 that are big enough to store most any type of data). This may function well for some cases, but not well for others where reserving large portions of global memory 20 may not be possible. In some cases, the developers may develop kernels such that the kernels do not produce too much data, thereby minimizing the chances of deadlock.

Although processor 14 is described as defining buffers 22, the techniques described in this disclosure are not so limited. In some examples, a processing unit other than processor 14 may be configured to define buffers 22. In some examples, it may be possible for GPU 16 to define buffers 22. However, for ease of description, the techniques are described with respect to processor 14 defining buffers 22.

Processor 14 may transmit the information of buffers 22 to pipeline processing unit (PMU) 18. For example, PMU 18 may receive information indicating the number of buffers 22, the starting and ending addresses of buffers 22, the length and width of buffers 22, and any other information that processor 14 determined for buffers 22. PMU 18 may store such state information of buffers 22 within registers located within IC 12. With the information of buffers 22 from processor 14, PMU 18 may be configured to manage the state information of buffers 22 as threads of kernels executing on programmable compute units produce and consume data.

For instance, after a programmable compute unit, executing threads of a kernel, produces data and outputs the produced data, PMU 18 may receive the data, and determine the address for where the data is to be stored. For example, PMU 18 may determine in which one of buffers 22 to store the data. In examples where buffers 22 are ring buffers or FIFO buffers, PMU 18 may store the information for the pointers that identify the start and end of buffers 22. For ring buffers, PMU 18 may also store the information for pointers that identify start of valid data and the end of valid data.

Accordingly, rather than the kernels including instructions that cause the programmable compute units to determine the addresses for where the produced data is to be stored or where data is to be retrieved from for consumption, PMU 18 may be configured to determine the addresses for where the produced data is to be stored or where data is to be retrieved from for consumption. In this way, GPU 16 may not waste clock cycles and the ALUs of the programmable compute units may not waste processing power determining addresses for where data is to be stored or from where data is to be retrieved.

Moreover, PMU 18 may be configured to determine when data that is to be consumed is ready for consumption. For example, rather than global memory 20 storing an atomic counter, PMU 18 may store the atomic counter locally within IC 12 (e.g., within registers in a local cache memory within IC 12). As one example, when a programming compute unit, executing a producer thread, outputs data, PMU 18 may read the value of the internally stored atomic counter, modify the value of the atomic counter based on the amount of produced data, and write the modified value of the atomic counter within IC 12. In this example, when a programming compute unit, executing a consumer thread, reads the value of the atomic counter, GPU 16 may not need to determine the value of the atomic counter by accessing off-chip global memory 20. Instead, PMU 18 may provide the value of the atomic counter.

In some examples, PMU 18 storing the value of the atomic counter locally may reduce spinning For example, a programmable compute unit, executing a consumer thread, may output a request for data that is to be consumed by the consumer thread. In this example, PMU 18 may determine whether the data that is to be consumed is available (e.g., based on the value of the locally stored atomic counter).

If PMU 18 determines that data is not yet available for consumption, PMU 18 may indicate to the programmable compute unit that the programmable compute unit should switch to a different thread (e.g., of the same kernel or possibly a different kernel) that does not rely upon the not-yet-available data. In other words, PMU 18 may indicate that the consumer thread that needs the not-yet-available data should be put to sleep so that the programmable compute unit can keep executing other threads. Then, when the data is available, as determined by PMU 18 based on the locally stored value of the atomic counter, PMU 18 may instruct the programmable compute unit to switch back to the sleeping thread (i.e., awaken the thread) so that the programmable compute unit can execute the consumer thread using the now-available-data. In this way, when data is not yet available for consumption, the programmable compute unit, executing the consumer threads, may be able to execute other threads of kernel, rather than remaining in a busy-wait state.

As another example, when two producer threads of a same kernel executing on different programmable compute units attempt to write data at the same time to the same one of buffers 22, PMU 18 may allow access to one of the producer threads and deny access to the other producer thread. In this example, PMU 18 may instruct the programmable compute unit, executing the thread that was denied access, to execute other threads of the kernel. When write access to buffers 22 becomes available, as determined by PMU 18, PMU 18 may indicate to the programmable compute unit that was executing the thread that was denied access that write access to buffers 22 is now available. In this manner, the programmable compute unit, executing the thread that was denied access, may be able to execute additional threads.

Similarly, when two consumer threads attempt to read data at the same time from the same one of buffers 22, PMU 18 may allow access to one of the consumer threads and deny access to the other consumer thread. Similar to the example where two threads are writing at the same time, in this example where two threads are reading at the same time, PMU 18 may instruct the programmable compute unit, executing the thread that was denied access, to execute other threads. When read access to buffers 22 becomes available, as determined by PMU 18, PMU 18 may indicate to the programmable compute unit that was executing the thread of that was denied access that read access to buffers 22 is now available. In this manner, the programmable compute unit, executing the thread that was denied access, may be able to execute additional threads.

In this way, processor 14 defining buffers 22 in global memory 20, and PMU 18 managing the state of buffers 22 in global memory 20 may allow efficient execution of kernels in a pipeline fashion by GPU 16. As one example, PMU 18 may minimize the number of off-chip accesses needed to execute kernels in a pipeline fashion. As another example, because PMU 18 may determine addresses of where data should be stored or from where data should be retrieved, GPU 16 may not waste power and clock cycles determining such addresses by executing instructions within the kernels for determining such addresses. In other words, PMU 18 may determine the addresses of where data is to be stored or retrieved from without the threads including instructions for determining where the data is to be stored or retrieved from. Also, PMU 18 may allow programmable compute units to execute threads of kernels without spinning For example, when data from a producer kernel is not yet available, PMU 18 may allow for other threads of a consumer kernel (e.g., threads that do not require the data from the producer kernel) to execute.

Figure 2:
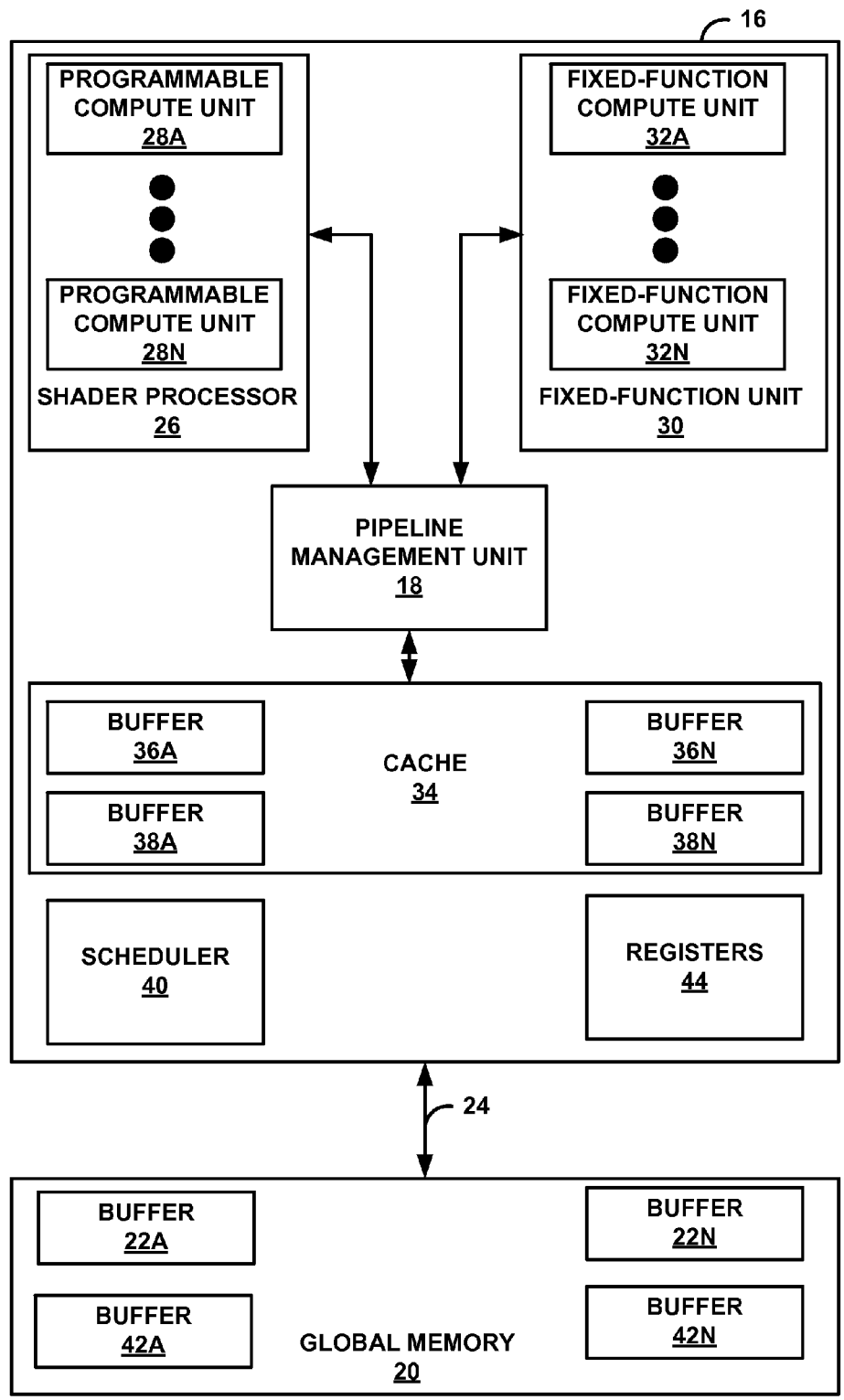
FIG. 2 is a block diagram illustrating a graphics processing unit (GPU) and a global memory in further detail.

FIG. 2 is a block diagram illustrating a graphics processing unit (GPU) and a global memory in further detail. For example, FIG. 2 illustrates GPU 16 and global memory 20 of FIG. 1 further detail. As illustrated, GPU 16 includes shader processor 26, fixed-function unit 30, pipeline management unit (PMU) 18, cache 34, scheduler 40, registers 44. In some examples, registers 44 may be part of cache 34. In the example illustrated in FIG. 2, PMU 18 is illustrated as being formed within GPU 16. However, as described above, PMU 18 may be formed outside of GPU 16, and in the same integrated circuit as GPU 16.

Shader processor 26 may include programmable compute unit 28A-28N (commonly referred to as programmable compute units 28), which may be considered as shader cores. Fixed-function unit 30 includes fixed-function compute unit 32A-32N (commonly referred to as fixed-function compute units 32). Shader processor 26 and fixed-function unit 30 may include one or more of programmable compute units 28 and fixed-function units 32 (e.g., more or fewer than those illustrated).

Programmable compute units 28 may function as described above. For example, programmable compute units 28 may execute both graphics and non-graphics related applications (e.g., shaders and kernels). For instance, programmable compute units 28 may execute kernels that are written in device language (such as, for example, OpenCL C language). As described above, one of programmable compute units 28 may include local memory for storing intermediate results and for sharing between threads of a kernel executing on that programmable compute unit 28. The local memory of each of programmable compute units 28 may not be accessible by other programmable compute units 28. In some examples, it may be possible for one of programmable compute units 28 to schedule the time when another one of programmable compute units 28 is to execute threads of a kernel.

In some instances, one of programmable compute units 28 may transmit data to one or more other ones of programmable compute units 28. For example, to execute kernels in a pipeline fashion, a first one of programmable compute units 28, executing a producer thread, may output data (e.g., non-graphics related data) to a second one of programmable compute units 28. As described above, the transmitting one of programmable compute units 28 (e.g., the programmable compute unit executing the producer thread) may store data in a buffer, such as one of buffers 22 of global memory 20, and the receiving one of programmable compute units 28 (e.g., the programmable compute unit executing the consumer thread) may retrieve the data from one of buffers 22 of global memory 20.

As illustrated in FIG. 2, in some examples, GPU 16 may include an internal cache 34. However, cache 34 may be internal to IC 12 rather than being limited to being internal to GPU 16. In some examples, rather than storing produced data off-chip (e.g., in global memory 20), it may be possible for GPU 16 to store the data internal to GPU 16 or IC 12 as well. For instance, the transmitting one of programmable compute units 28 may store the data in one or more of buffers 36A-36N (collectively referred to as buffers 36) in cache 34, which is within GPU 16 in the example of FIG. 2, but could be within IC 12 and external to GPU 16. The receiving one of programmable compute units 28 may retrieve the data from buffers 36 in cache 34. The buffers within cache 34 may be cache-backed buffers of buffers 22 in global memory 20. In other words, buffers 22 of global memory 20 may store the complete data produced by a producer thread that is to be consumed by a consumer thread, and buffers 36 may function as a cache that stores some of the produced data for quick access as compared to accessing data from global memory 20.

Buffers 36 within cache 34 may be similar to buffers 22. For example, buffers 36 may be FIFO buffers or ring buffers. It may be desirable for cache 34 to include buffers 36 to avoid memory latency and power consumption associated with accessing off-chip memory (e.g., buffers 22 of global memory 20). However, utilizing only buffers 36 may not be practical due to the limited available space for storage. In this manner, it may be possible to store some of the data within buffers 36 and allow for spill over into buffers 22.

Buffers 36 and buffers 22 may allow for GPU 16 to execute kernels in a pipeline fashion. For example, buffers 36 and buffers 22 may be considered as data structures that allow for communication between programmable compute units 28. Buffers 36 and buffers 22 may be configured to store more data than the minimum amount of data that kernels executing on programmable compute units may output (e.g., more than one data unit). In this manner, threads of a kernel, executing on one of programmable compute units 28, may be able to produce a variable amount of data that is stored in buffers 36 and buffers 22 and that can be passed to threads another kernel, executing on another one of programmable compute units 28, for consumption.

Fixed-function compute units 32 may provide fixed-functionality and may be formed as hardware units (as a non-limiting example). Fixed-function compute units 32 may be considered as executing specific built-in kernels that are written using device language. For example, whereas programmable compute units 28 may provide functional flexibility, fixed-function compute units 32 may be limited in their respective functional flexibility. For instance, fixed-function compute units 32 may include rasterization units, primitive assembly units, viewport transformation unit, and other such units that provide specific graphics functionality.

In some instances, fixed-function compute units 32 may be hardwired to perform their respective specific functions. Also, it may be possible for fixed-function compute units 32 to schedule when another one of fixed-function compute units 32 is to execute. Moreover, in some cases, if GPU 16 does not include a specific one of fixed-function compute units 32, it may be possible to develop a kernel that performs the function of the unavailable fixed-function compute unit. In other words, the kernel may emulate the fixed-function behavior of the unavailable fixed-function compute unit. For instance, if a fixed-function tessellator is not available, a developer may develop a tessellation kernel that emulates the fixed-function behavior of the tessellator and execute the kernel on one or more of programmable compute units 28.

In some examples, GPU 16 may include scheduler 40. Scheduler 40 may assign threads and operations to the various programmable compute units 28 and fixed-function units 32. For example, scheduler 40 may load balance the tasks performed by programmable compute units 28 so that no one of programmable compute units 28 is over utilized while others are under-utilized. Scheduler 40 may be implemented as hardware or software executing on hardware.

In FIG. 2, global memory 20 may include buffer 42A-42N (collectively referred to as buffers 42), and cache 34 may include buffer 38A-38N (collectively referred to as buffers 38). Buffers 38 may not be necessarily in every example, and may form as optional on-chip cache for providing cache-backed storage for the commands stored in buffers 42. Buffers 42 and buffers 38 may be considered as command queues. There may be a command queue (e.g., one of buffers 42 and buffers 38) for all programmable compute units 28 and one queue for each type of fixed-function compute unit 32. Buffers 42 and buffers 38 may store zero or more entries.

Buffers 42 and optional on-chip buffers 38 may assist with organizing the workload scheduling for programmable compute units 28 and fixed-function compute units 32. For example, buffers 42 may store the commands that instruct programmable compute units 28 and fixed-function compute units 32 to perform various tasks. For instance, each entry in buffers 42 may store information for causing available one or more programmable compute units 28 to execute threads of the kernels, as well as store information for kernel argument values and dependency information. In some examples, dependencies between the threads of a kernel may need to be satisfied before one or more programmable compute units 28 execute the kernel.

Buffers 22 may be accessible by both processor 14 (FIG. 1) and GPU 16. As one example, processor 14 may access buffers 22 using calls in accordance with the various APIs described above. GPU 16 may access buffers 22 based on kernels executed on programmable compute units 28. For example, the kernels may be developed with functions to store produced data into global memory 20.

As illustrated, GPU 16 may also include pipeline management unit (PMU) 18. As described above, PMU 18 may manage the state of buffers 22 within global memory 20. Additionally, PMU 18 may manage the state of buffers 36 within cache 34.

For example, PMU 18 may manage the state of buffers 22 and buffers 36 by storing the length and width of buffers 22 and buffers 36, including the number of buffers 22 and buffers 36 that are available to store produced data. As one example, PMU 18 may allocate buffers 22 ahead of kernels executing on programmable compute units 28, and may de-allocate buffers 22 at the end of the execution of the kernels.

As another example, PMU 18 may store information for the header pointer, current offset, maximum depth, and the like in on-chip registers 44. In some examples, PMU 18 may state information of buffers 22 and buffers 36 in a manner similar to how texture parameters are stored in graphics processing.

Buffers 22 may require management in the sense of determining which buffers 22 to store data into or retrieve data from, determining storage locations of where to store the data in the buffers or from where to retrieve the data (e.g., determining addresses), and ensuring that different ones of programmable compute units 28 do not attempt to access information from the buffers that causes data corruption. PMU 18 may be tasked with such management. For example, with GPU 16 including PMU 18 or the IC that includes GPU 16 including PMU 18, the management of buffers 22 may be localized to within the IC that includes GPU 16 rather than external to the IC. This may result in reduced power consumption, as well as efficient execution of kernels executing on programmable compute units 28.

As one example, PMU 18 may store an atomic counter within registers 44. Registers 44 may be part of cache 34, or part of some other memory within GPU 16 or IC 12. The atomic counter may indicate whether access for one of programmable compute units 28 is available (e.g., whether data is available to be read or whether two or more kernels are attempting to write or read at the same time from the same buffers 22). Based on the atomic counter, PMU 18 may be able to properly allow access to one of programmable compute units 28 while denying access to other ones of programmable compute units 28 to avoid data corruption of buffers 22, which may occur if two threads attempt to write data at the same time. In some instances, when PMU 18 denies access to one of programmable compute units 28, PMU 18 may allow the task that request the access (e.g., a thread) to go to sleep, and allow the denied one of programmable compute units 28 to continue executing other tasks (e.g., threads). When access to the denied one of programmable compute units 28 becomes available, PMU 18 may awaken that task and provide the data to that task for further execution. In this way, programmable compute units 28 may not go completely idle, and other tasks of programmable compute units 28 may execute.

In some examples, when data needs to retrieved from one buffers 22 of global memory 20, PMU 18 may be able to retrieve additional data than the needed data. For example, PMU 18 may determine the starting and ending location of the requested data. However, PMU 18 may retrieve additional data that is stored in buffers 22 after the determined ending location of the requested data. PMU 18 may retrieve such additional data when PMU 18 determines that storage space is available in buffers 36. As described above, PMU 18 may manage both buffers 22 in global memory 20, as well as buffers 36 within cache 34. PMU 18 may then store the retrieved data in cache 34. In this manner, the additional data is already available within GPU 16 when such data is needed. Storing additional data (e.g., data in addition to the requested data) in buffers 36 may further reduce the number of times GPU 16 has to access data off-chip (e.g., from global memory 20).

To access data, programmable compute units 28 may utilize pointers to access the buffers (e.g., the kernels may be developed to access data using pointers). In some examples, PMU 18 may maintain pointer information so that programmable compute units 28 are able to properly access the data. For example, programmable compute units 28 may output specialized instructions that request information about buffers 22 to PMU 18. Such instructions may include information for the number of elements within the buffers, how much data is stored in within the buffer (e.g., width of the buffer), where the information is stored, and other such information. In this manner, ensuring that programmable compute units 28 properly access buffers 22 may be performed internally to the IC that houses GPU 16, which possibly reduces the access external to the IC that houses GPU 16.

As one example, to ensure that data does not become corrupt or lost, a producer kernel may be developed to include instructions to query the range of buffers 22 (e.g., starting and ending points). In this example, the one of programmable compute units 28 that is executing the producer kernel may output the query of the range of buffers 22 to PMU 18. PMU 18 may have stored the information of the range of buffers 22 in registers 44 (e.g., by receive such information from processor 14 when processor 14 defined buffers 22). PMU 18 may return the result of the range of buffers 22 to the producer kernel.

As another example, for executing kernels in a pipeline fashion, in some examples, it may be necessary to maintain the order of the data in the pipeline. For example, assume that the first kernel is to produce data that is to be consumed by a second kernel. However, in this case, it may be possible that a third kernel is also executing during the same time that the first and second kernels are executing. In this case, it may be possible for the data produced by the first kernel and the data produced by the third kernel to be reordered, and possibly resulting in the second kernel consuming the incorrect data.

To ensure proper ordering, in some examples, in addition to the atomic counter that indicates whether buffers 22 are available for access, PMU 18 may store additional atomic counters in registers 44. These additional atomic counters may be referred to as device-atomic counters. For example, there may a device-atomic counter associated with each one of buffers 22. Also, PMU 18 or scheduler 40 may be configured to assign a token to each thread of each kernel that defines the relative position of where data produced by that thread is to be stored in buffers 22. This token for a thread may be the current value of the device-atomic counter.

For example, PMU 18 may assign a first consumer thread that is to consume the data first with a token value of 0, assign a second consumer thread that is to consume the data second with a token value of 1, and so forth. Each of these consumer threads may request the value of the device-atomic counter from PMU 18. If the current value of the device-atomic counter is equal to the token value of the consumer thread, then the consumer thread may consume the data. Otherwise, the consumer thread may not consume the data.

After the consumer thread, whose token value equals the value of the device-atomic counter, consumes the data, PMU 18 may update the value of the device-atomic counter. In some examples, the amount of data that the consumer thread is to consume may be fixed, and PMU 18 may update the value of the device-atomic counter after the fixed amount of data is retrieved from buffers 22. However, in some examples, the amount of data that the consumer thread is to consume may not be fixed. In these examples, after the consumer thread finishes receiving the data, the consumer thread may indicate to PMU 18 that PMU 18 should increase the value of the device-atomic counter so that the next consumer thread can consume the data. In this manner, the device-atomic counter, whose value PMU 18 may store in registers 44 and update, may ensure that the order in which the data is to be consumed is preserved, and consumer threads that should not receive data out-of-turn do not receive data out-of-turn.

As another example, PMU 18 may store information in registers 44 to minimize the chances of deadlock. For example, as described above, processor 14 may be configured to define an amplification factor for buffers 22 which indicates the maximum number of elements that can be produced by a thread of a kernel for storing in one of buffers 22. If the kernel produces more data than defined by the amplification factor, then the kernel may become deadlocked (e.g., stop executing). Processor 14 may provide the value of the amplification factor to PMU 18, and PMU 18 may store the value of the amplification factor within registers 44.

In some examples, to minimize the chances of deadlock, the developer may include instructions in the kernel that request the value of the amplification factor. The one of programmable compute units 28 executing the kernel may output the request for the value of the amplification factor to PMU 18. In turn, PMU 18 may indicate the value of the amplification factor to the one of programmable compute units 28 executing the kernel. If the programmable compute unit 28 determines that the amount of data produced by the threads of the kernel will be larger than the amplification factor, the programmable compute unit 28 may stop the execution of the kernel once the amount of produced data equals the amplification factor, and may schedule the execution of the remaining threads of kernel once the already produced data is consumed.

In addition or instead of the above technique to minimize deadlock, PMU 18 may implement an advance scheduling in which PMU 18 may store data in buffers 22 until the produced data equals the amplification factor. PMU 18 may then store the remaining data in buffers 36. In other words, PMU 18 may ensure that the requests to store data in buffer 22 are within the "safe" range, and that any request to store data in buffer 22 in instead stored in buffer 36.

Figure 3:
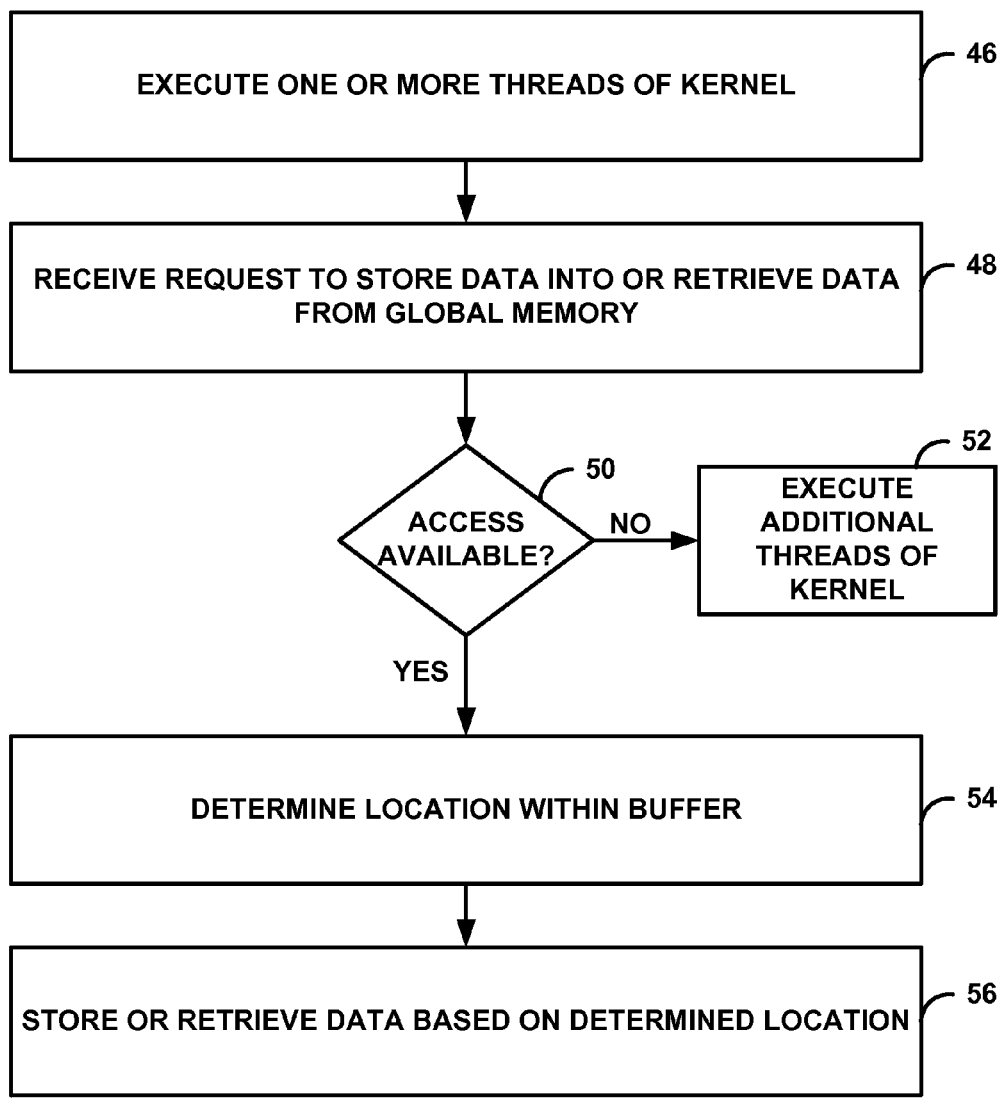
FIG. 3 is a flowchart illustrating an example technique in accordance with one or more examples described in this disclosure.

FIG. 3 is a flowchart illustrating an example technique in accordance with one or more examples described in this disclosure. As illustrated in FIG. 3, one of programmable compute units 28 may execute one or more threads of a kernel on shader processor 26 of GPU 16 (46). PMU 18, which is within IC 12 or within GPU 16, may receive a request from the one of programmable compute units 28 to store data into or retrieve data from global memory 20, which is external to IC 12, for the one or more threads of the kernel (48).

PMU 18 may determine whether access is allowable for the one of programmable compute units 28 that requested the storage or retrieval of data (50). If access is not available (NO of 50), the one of programmable compute units 28 may execute additional threads of the kernel (52). In this example, PMU 18 may indicate to the one of programmable compute unit when access is available.

If access is available (YES of 50), the one of programmable compute unit 28 may determine a location within a buffer (e.g., one of buffers 22) in global memory 20 of where the data is to be stored or retrieved from (52). For example, PMU 18 may determine the location (i.e., address) within global memory 20 of where the data is to be stored or from where the data is to be retrieved (54). Based on the determined location, GPU 16 may then store the data into or retrieve the data from the determined location within one of the of buffers 22 within global memory 20 (56).

In some examples, to determine the location within the one of buffers 22, PMU 18 may determine the location without the one or more threads of the kernel indicating the location of where the data is to be stored or retrieved from in global memory 20. In this way, the kernels need not include instructions for determining the location within global memory 20 for where to store data or from where the data is to be retrieved.

In some examples, PMU 18 may retrieve data in addition to the requested data. In these examples, PMU 18 may store the additional data in cache 34. In some examples, PMU 18 may receive state information of buffers 22 from processor 14. In these examples, PMU 18 may determine the location within the ones of buffer 22 of where the data is to be stored or retrieved from based on the received state information.

Figure 4:
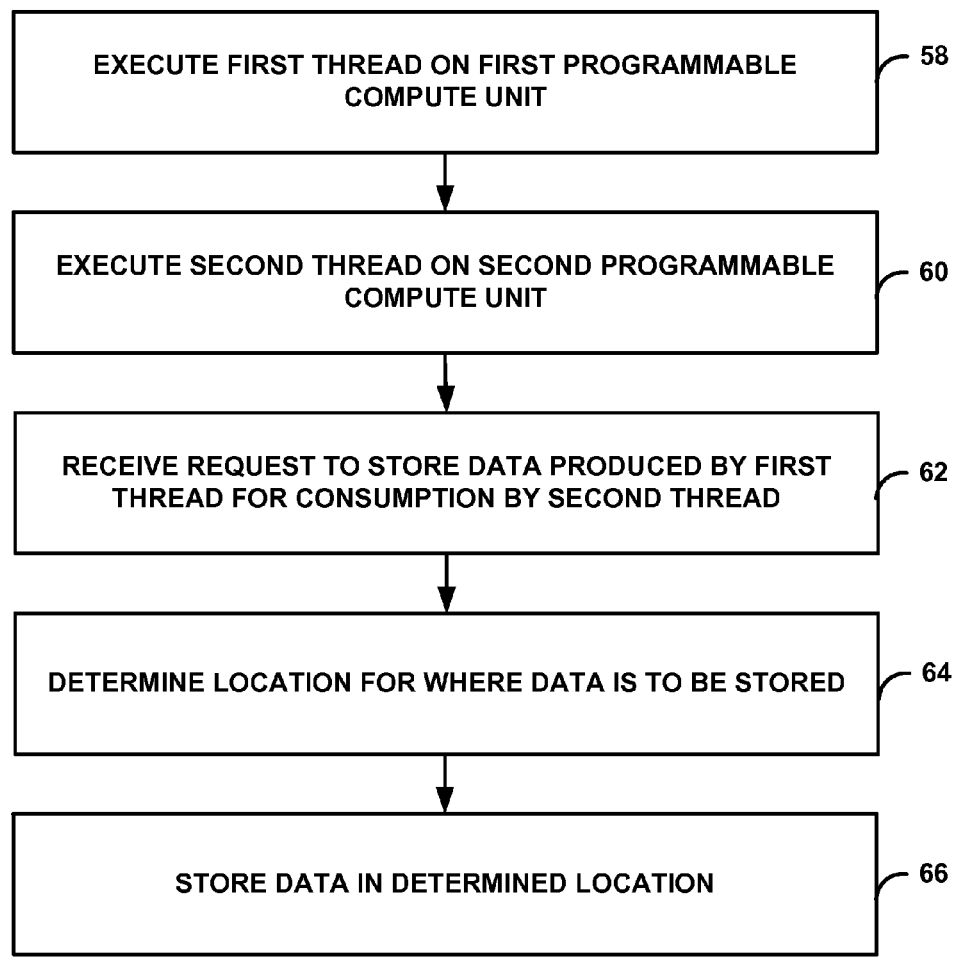
FIG. 4 is a flowchart illustrating another example technique in accordance with one or more examples described in this disclosure.

FIG. 4 is a flowchart illustrating another example technique in accordance with one or more examples described in this disclosure. As illustrated, a first programmable compute unit (e.g., one of programmable compute units 28) of shader processor 26 of GPU 16 may execute a first thread (58). A second programmable compute unit (e.g., another one of programmable compute units 28) of shader processor 26 of GPU 16 may execute a second, different thread (60).

PMU 18, which is within IC 12 that includes GPU 16, may receive a request from the first programmable compute unit to store data produced by the execution of the first thread into a buffer (e.g., one of buffers 22) in global memory 20, which is external to IC 12 (62). In this example, the data produced by the execution of the first thread (e.g., a producer thread) is to be consumed by the second programmable compute unit executing the second thread (e.g., a consumer thread). Also, the buffer may be one of a first-in-first-out (FIFO) buffer and a ring buffer, where a ring buffer is one example of a FIFO buffer.

PMU 18 may determine a location within the buffer for where the data produced by the execution of the first thread is to be stored (64). IC 12 may store the data produced by the execution of the first thread in the determined location within the buffer (66). It should be understood that IC 12 storing data produced by the execution of the first thread in the determined location within the buffer includes IC 12 storing the data, GPU 16 storing the data, and/or PMU 18 storing the data. In other words, IC 12 storing the data means IC 12 or any component within IC 12 storing the data.

In some examples, PMU 18 may store state information of buffers 22 within IC 12 (e.g., within registers 44). PMU 18 may receive such state information of buffers 22 from processor 14. The state information of buffers 22 may include one or more of a starting address of buffers 22, an ending address of buffers 22, an address within buffers 22 where produced data is to be stored, and an address within buffers where data is to be retrieved. In these examples, PMU 18 may determine the location within the buffer for where the data produced by the execution of the first thread is to be stored based on the stored state information of buffers 22. Moreover, in some examples, PMU 18 may determine the location within the buffer for where the data produced by the execution of the first thread is to be stored without the first thread indicating the location of where the data is to be stored in the buffer.

PMU 18 may also receive a request from the second programmable compute unit executing the second thread to retrieve at least some of the data produced by the execution of the first thread. PMU 18 may determine whether the data that is produced by the execution of the first thread is available for retrieval for consumption by the second programmable compute unit executing the second thread. In some examples, PMU 18 may receive the request from the second programmable compute unit at a same time, prior to, or after receiving the request from the first programmable compute unit to store data produced by the execution of the first thread.

When the data requested by the second thread is not available for retrieval for consumption by the second programmable compute unit executing the second thread, PMU 18 may indicate to the second programmable compute unit to execute a third thread. PMU 18 may also indicate to the second programmable compute unit when the data requested by the second thread is available for retrieval for consumption by the second programmable compute unit executing the second thread. PMU 18 may further indicate to the second programmable compute unit to execute the second thread to consume the data requested by the second thread when the data requested by the second thread is available for retrieval for consumption by the second programmable compute unit executing the second thread.

In some cases, the first thread may be a producer thread of a kernel and the second thread may be a consumer thread of the same kernel. In some cases, the first thread may be a thread of a producer kernel, and the second thread may be a thread of a consumer kernel.

Figure 5:
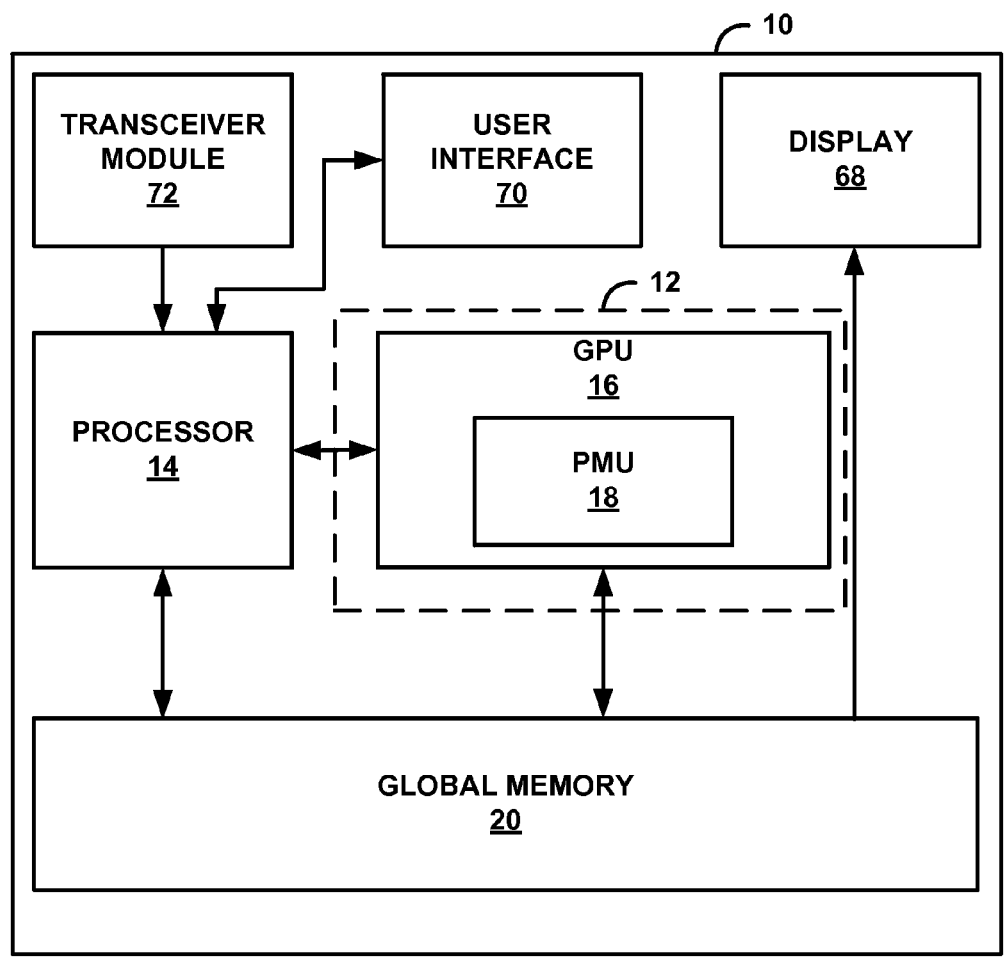
FIG. 5 is a block diagram illustrating a device of FIG. 1 in further detail.

FIG. 5 is a block diagram illustrating a device of FIG. 1 in further detail. For example, FIG. 5 further illustrates device 10. Examples of device 10 include, but are not limited to, wireless devices, mobile telephones, personal digital assistants (PDAs), video gaming consoles that include video displays, mobile video conferencing units, laptop computers, desktop computers, television set-top boxes, tablet computing devices, e-book readers, and the like. Device 10 may include processor 14, GPU 16, global memory 20, display 68, user interface 70, and transceiver module 72. In the illustrated example, PMU 18 is formed within GPU 16. In some examples, PMU 18 may be formed within the same IC that houses GPU 16 (i.e., IC 12). Also as illustrated, GPU 16 resides within IC 12. However, processor 14 may also reside within IC 12.

Device 10 may include additional modules or units not shown in FIG. 4 for purposes of clarity. For example, device 10 may include a speaker and a microphone, neither of which are shown in FIG. 4, to effectuate telephonic communications in examples where device 10 is a mobile wireless telephone. Furthermore, the various modules and units shown in device 10 may not be necessary in every example of device 10. For example, user interface 70 and display 68 may be external to device 10 in examples where device 10 is a desktop computer. As another example, user interface 70 may be part of display 68 in examples where display 68 is a touch-sensitive or presence-sensitive display of a mobile device.

Processor 14, GPU 16, PMU 18, and global memory 20 of FIG. 4 may be similar to processor 14, GPU 16, PMU 18, and global memory 20 of FIG. 1. Examples of user interface 70 include, but are not limited to, a trackball, a mouse, a keyboard, and other types of input devices. User interface 70 may also be a touch screen and may be incorporated as a part of display 68. Transceiver module 72 may include circuitry to allow wireless or wired communication between device 10 and another device or a network. Transceiver module 72 may include modulators, demodulators, amplifiers and other such circuitry for wired or wireless communication. Display 68 may comprise a liquid crystal display (LCD), a cathode ray tube (CRT) display, a plasma display, a touch-sensitive display, a presence-sensitive display, or another type of display device.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method for execution of data processing operations in a pipeline fashion, the method comprising:
executing a first thread on a first programmable compute unit of a shader processor of a graphics processing unit (GPU), wherein the shader processor includes a plurality of programmable compute units including the first programmable compute unit;
executing a second thread on a second programmable compute unit of the plurality of programmable compute units of the shader processor of the GPU;
receiving, directly with a management unit within an integrated circuit (IC) that includes the GPU, a request from the first programmable compute unit to store data produced by the execution of the first thread into a buffer in an integrated global memory external to the IC shared by the plurality of programmable compute units, wherein the data produced by the execution of the first thread is to be consumed by the second programmable compute unit executing the second thread, and wherein the buffer comprises a first-in-first-out (FIFO) buffer;
determining, directly with the management unit, a location within the buffer where the data produced by the execution of the first thread is to be stored; and
storing, with the IC, the data produced by the execution of the first thread in the determined location within the buffer.

2. The method of claim 1, further comprising:
storing, with the management unit, state information of the buffer within the IC, wherein the state information of the buffer includes one or more of a starting address of the buffer, an ending address of the buffer, an address within the buffer where produced data is to be stored, and an address within the buffer where data is to be retrieved,
wherein determining the location within the buffer comprises determining the location within the buffer for where the data produced by the execution of the first thread is to be stored based on the stored state information of the buffer.

3. The method of claim 1, further comprising:
receiving, with the management unit, a request from the second programmable compute unit executing the second thread to retrieve at least some of the data produced by the execution of the first thread; and
determining, with the management unit, whether the data that is produced by the execution of the first thread is available for retrieval for consumption by the second programmable compute unit executing the second thread.

4. The method of claim 3, wherein receiving the request from the second programmable compute unit comprises receiving the request from the second programmable compute unit at a same time, prior to, or after receiving the request from the first programmable compute unit to store data produced by the execution of the first thread.

5. The method of claim 3, further comprising:
when the data requested by the second thread is not available for retrieval for consumption by the second programmable compute unit executing the second thread, indicating, with the management unit, to the second programmable compute unit to execute a third thread;
indicating, with the management unit, to the second programmable compute unit when the data requested by the second thread is available for retrieval for consumption by the second programmable compute unit executing the second thread; and
indicating, with the management unit, to the second programmable compute unit to execute the second thread to consume the data requested by the second thread when the data requested by the second thread is available for retrieval for consumption by the second programmable compute unit executing the second thread.

6. The method of claim 3, further comprising:
retrieving, with the management unit, data from the global memory in addition to the data requested by the second thread; and
storing, with the management unit, the data in addition to the data requested by the second thread in a cache within the IC.

7. The method of claim 1, wherein executing the first thread comprises executing a producer thread of a kernel, and wherein executing the second thread comprises executing a consumer thread of the kernel.

8. The method of claim 1, wherein executing the first thread comprises executing the first thread of a producer kernel, and wherein executing the second thread comprises executing a thread of a consumer kernel.

9. The method of claim 1, wherein the GPU includes the management unit, and wherein the FIFO buffer comprises a ring buffer.

10. The method of claim 1, wherein determining the location within the buffer comprises determining the location within the buffer for where the data produced by the execution of the first thread is to be stored without the first thread indicating the location of where the data is to be stored in the buffer.

11. An apparatus comprising:
an integrated global memory shared by a plurality of programmable compute units that includes a buffer, wherein the buffer comprises a first-in-first-out (FIFO) buffer;
an integrated circuit (IC) comprising:
a graphics processing unit (GPU), the GPU comprising:
the plurality of programmable compute units;
a first programmable compute unit of the plurality of programmable compute units configured to execute a first thread; and
a second programmable compute unit of the plurality of programmable compute units configured to execute a second thread; and
a management unit configured to:
directly receive a request from the first programmable compute unit to store data produced by the execution of the first thread into the buffer in the global memory, wherein the data produced by the execution of the first thread is to be consumed by the second programmable compute unit executing the second thread; and
directly determine a location within the buffer where the data produced by the execution of the first thread is to be stored, wherein the IC is configured to store the data produced by the execution of the first thread in the determined location within the buffer.

12. The apparatus of claim 11,
wherein the management unit is configured to store state information of the buffer within the IC,
wherein the state information of the buffer includes one or more of a starting address of the buffer, an ending address of the buffer, an address within the buffer where produced data is to be stored, and an address within the buffer where data is to be retrieved, and
wherein the management unit is configured to determine the location within the buffer for where the data produced by the execution of the first thread is to be stored based on the stored state information of the buffer.

13. The apparatus of claim 11, wherein the management unit is configured to:
receive a request from the second programmable compute unit executing the second thread to retrieve at least some of the data produced by the execution of the first thread; and
determine whether the data that is produced by the execution of the first thread is available for retrieval for consumption by the second programmable compute unit executing the second thread.

14. The apparatus of claim 13, wherein the management unit is configured to receive the request from the second programmable compute unit at a same time, prior to, or after receiving the request from the first programmable compute unit to store data produced by the execution of the first thread.

15. The apparatus of claim 13, wherein the management unit is configured to:
when the data requested by the second thread is not available for retrieval for consumption by the second programmable compute unit executing the second thread, indicate to the second programmable compute unit to execute a third thread;
indicate to the second programmable compute unit when the data requested by the second thread is available for retrieval for consumption by the second programmable compute unit executing the second thread; and
indicate to the second programmable compute unit to execute the second thread to consume the data requested by the second thread when the data requested by the second thread is available for retrieval for consumption by the second programmable compute unit executing the second thread.

16. The apparatus of claim 13, wherein the management unit is configured to:
retrieve, from the global memory, data in addition to the data requested by the second thread; and
store the data in addition to the data requested by the second thread in a cache within the IC.

17. The apparatus of claim 11, wherein the first thread comprises a producer thread of a kernel, and the second thread comprises a consumer thread of the kernel.

18. The apparatus of claim 11, wherein the first thread comprises a thread of a producer kernel, and the second thread comprises a thread of a consumer kernel.

19. The apparatus of claim 11, wherein the GPU includes the management unit, and wherein the FIFO buffer comprises a ring buffer.

20. The apparatus of claim 11, wherein the management unit is configured to determine the location within the buffer for where the data produced by the execution of the first thread is to be stored without the first thread indicating the location of where the data is to be stored in the buffer.

21. The apparatus of claim 11, wherein the apparatus comprises one of a video device, a set-top box, a wireless handset, a personal digital assistant, a desktop computer, a laptop computer, a gaming console, a video conferencing unit, and a tablet computing device.

22. An apparatus comprising:
an integrated global memory shared by a plurality of programmable compute units that includes a buffer, wherein the buffer comprises a first-in-first-out (FIFO) buffer; and
an integrated circuit (IC) comprising:
a graphics processing unit (GPU) comprising:
means for executing a first thread; and
means for executing a second thread; and
means for directly receiving a request from the means for executing the first thread to store data produced by the execution of the first thread into the buffer in the global memory, wherein the data produced by the execution of the first thread is to be consumed by the means for executing the second thread;
means for directly determining a location within the buffer where the data produced by the means for executing the first thread is to be stored; and
means for storing the data produced by the execution of the first thread in the determined location within the buffer.

23. A non-transitory computer-readable storage medium having instructions stored thereon that when executed cause one or more processors to:
execute a first thread on a first programmable compute unit of a shader processor of a graphics processing unit (GPU), wherein the shader processor includes a plurality of programmable compute units including the first programmable compute unit;
execute a second thread on a second programmable compute unit of the plurality of programmable compute units of the shader processor of the GPU;
receive, directly with a management unit within an integrated circuit (IC) that includes the GPU, a request from the first programmable compute unit to store data produced by the execution of the first thread into a buffer in an integrated global memory external to the IC shared by the plurality of programmable compute units, wherein the data produced by the execution of the first thread is to be consumed by the second programmable compute unit executing the second thread, and wherein the buffer comprises a first-in-first-out (FIFO) buffer;
determine, directly with the management unit, a location within the buffer where the data produced by the execution of the first thread is to be stored; and
store, with the IC, the data produced by the execution of the first thread in the determined location within the buffer.

* * * * *